(12) United States Patent
Kolluru et al.

(10) Patent No.: US 10,508,928 B2
(45) Date of Patent: Dec. 17, 2019

(54) ADAPTIVE DOWNLOAD OF MAP INFORMATION

(71) Applicant: Faraday&Future Inc., Gardena, CA (US)

(72) Inventors: Sethu Hareesh Kolluru, Fremont, CA (US); Luke Michael Ekkizogloy, Mountain View, CA (US); Yunwei Liu, Alameda, CA (US); Michael Lambertus Hubertus Brouwer, Los Gatos, CA (US)

(73) Assignee: FARADAY&FUTURE INC., Gardena, CA (US)

( * ) Notice: Subject to any disclaimer, the term of this patent is extended or adjusted under 35 U.S.C. 154(b) by 0 days.

(21) Appl. No.: 15/613,053

(22) Filed: Jun. 2, 2017

(65) Prior Publication Data

US 2018/0340792 A1 Nov. 29, 2018

Related U.S. Application Data

(60) Provisional application No. 62/345,609, filed on Jun. 3, 2016.

(51) Int. Cl.
*G01C 21/36* (2006.01)
*G01C 21/34* (2006.01)
*G01C 21/32* (2006.01)

(52) U.S. Cl.
CPC ......... *G01C 21/3626* (2013.01); *G01C 21/34* (2013.01); *G01C 21/32* (2013.01)

(58) Field of Classification Search
CPC .......................... G01C 21/3626; G06F 15/16
USPC ....................................................... 701/410
See application file for complete search history.

(56) References Cited

U.S. PATENT DOCUMENTS

| 8,849,552 B2 * | 9/2014 | Schunder | G01C 21/32 701/117 |
| 2013/0151659 A1 * | 6/2013 | Alberth | H04L 67/2847 709/217 |

\* cited by examiner

*Primary Examiner* — Maceeh Anwari
(74) *Attorney, Agent, or Firm* — Veros Legal Solutions, LLP

(57) ABSTRACT

Methods, systems, and apparatuses for adaptive download of map information are presented which include obtaining a route from a start location to a destination location for a vehicle, acquiring projected environmental information associated with a first portion in the route the vehicle is expected to traverse, acquiring projected network availability information associated with a second portion in the route the vehicle is expected to traverse; and determining whether to download map information associated with the first portion of the route based on (1) the projected environmental information and (2) the projected network availability information.

20 Claims, 5 Drawing Sheets

ADAPTIVE DOWNLOAD OF MAP INFORMATION

CROSS-REFERENCE TO RELATED APPLICATIONS

This application claims the benefit of U.S. Provisional Application No. 62/345,609, filed Jun. 3, 2016, the entirety of which is hereby incorporated by reference.

BACKGROUND

Aspects of the disclosure relate to providing access to map information useful for navigating vehicles. While navigating a vehicle, it may be desirable to obtain map information on the route ahead of time. This however might not be practical due to factors such as the size of the maps that need to be pre-stored in the vehicle's data storage unit, particularly in the case of high-definition (HD) maps for autonomous driving that are associated with significant amounts of data. Reliance on pre-storage of complete map information may be impractical, inflexible, and may increase the overall production cost of the vehicle, amongst other adverse considerations.

In addition, data pre-stored in the vehicle often do not include recent or live information on the frequently changing status of the route, such as variable environmental conditions. On the other hand, live data may not always be obtainable at all points in the travel route due to factors such as sporadic availability or reduced bandwidth of the network via which the vehicle communicates as it travels along the route. Exemplary embodiments of the disclosure address these problems, both individually and collectively.

BRIEF SUMMARY

Certain embodiments are described for navigating a vehicle. An exemplary embodiment includes (a) obtaining a route from a start location to a destination location for the vehicle, (b) acquiring projected environmental information associated with a first portion in the route the vehicle is expected to traverse, (c) acquiring projected network availability information associated with a second portion in the route the vehicle is expected to traverse, and (d) determining whether to download map information associated with the first portion of the route based on (1) the projected environmental information and (2) the projected network availability information.

Another exemplary embodiment includes an apparatus having a processor configured to obtain a route from a start location to a destination location for a vehicle. The processor is further configured to determine whether to download map information associated with a first portion of the route based on (1) acquired projected environmental information associated with the first portion in the route the vehicle is expected to traverse and (2) acquired projected network availability information associated with a second portion in the route the vehicle is expected to traverse. In addition, the apparatus includes a data storage unit configured to communicate with the processor and to store map information.

Another exemplary embodiment includes means for obtaining a route from a start location to a destination location for a vehicle, means for acquiring projected environmental information associated with a first portion in the route the vehicle is expected to traverse, means for acquiring projected network availability information associated with a second portion in the route the vehicle is expected to traverse, and means for determining whether to download map information associated with the first portion of the route based on (1) the projected environmental information and (2) the projected network availability information.

BRIEF DESCRIPTION OF THE DRAWINGS

Aspects of the disclosure are illustrated by way of example. In the accompanying figures, like reference numbers indicate similar elements.

DETAILED DESCRIPTION

Examples are described herein in the context of map information for vehicle navigation. Embodiments provided in the following description are illustrative only and not intended to limit the scope of the present disclosure. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in any such actual implementation, numerous implementation-specific details may nevertheless exist in order to achieve goals such as compliance with application- and business-related constraints, and that these specific goals can vary from one implementation to another.

Figure 1:
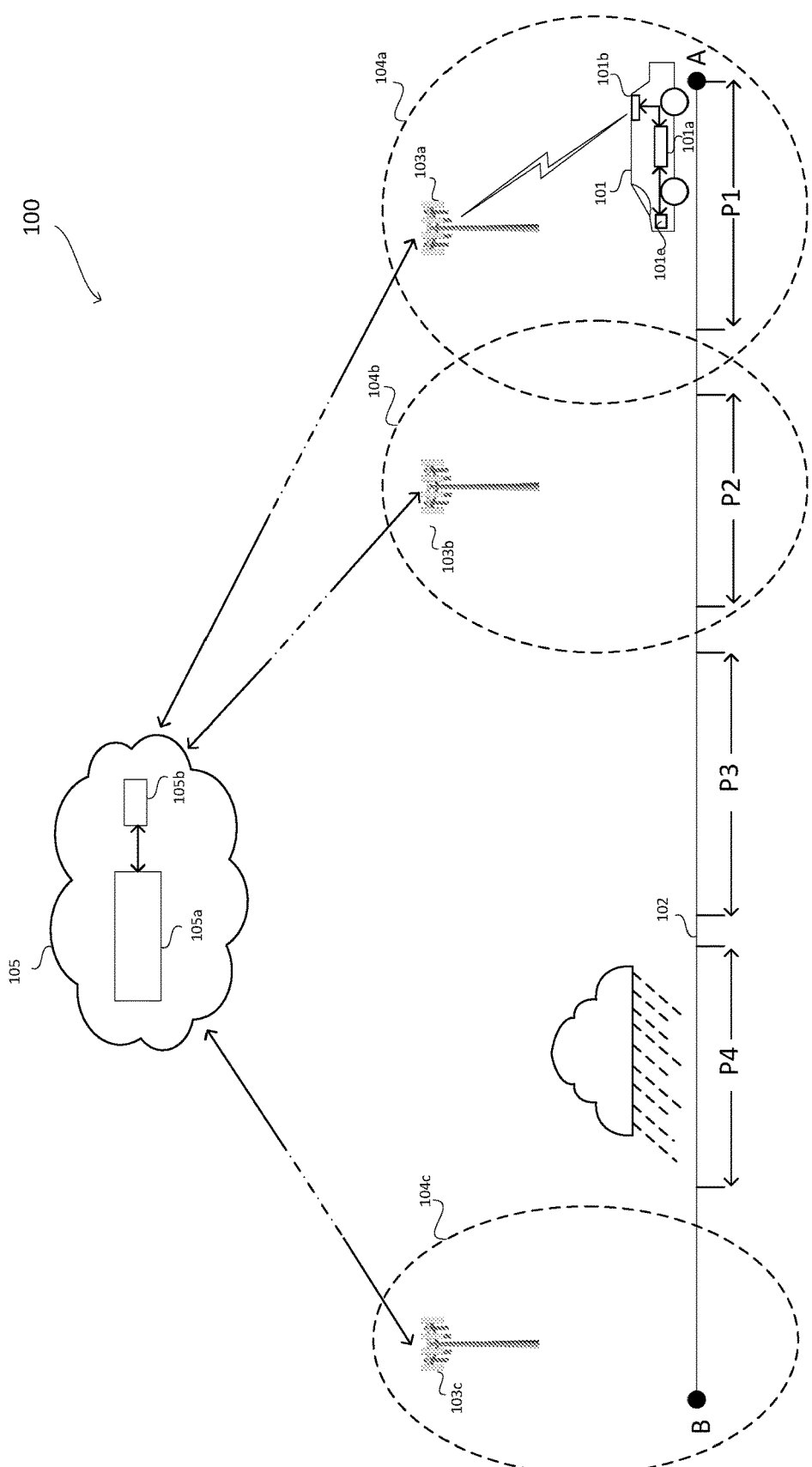
FIG. 1 illustrates an example environment in which various aspects of the disclosure can be implemented.

FIG. 1 illustrates an example environment 100 in which the various aspects of the disclosure can be implemented. FIG. 1 illustrates a vehicle 101 traveling along a route 102 from a start location A to a destination location B. For simplicity of illustration, in example environment 100, route 102 is partitioned into one or more separate portions, such as P1, P2, P3 and P4, although it is contemplated that a portion may be of any length, including the full length of route 102, and that the various portions may overlap in whole or in part with each other.

As shown in FIG. 1, while travelling along route 102, vehicle 101 communicates with a remote information server 105, such as a cloud server. In example environment 100, vehicle 101 wirelessly communicates with remote information server 105 via a network, such as via one or more cellular communication base-stations 103a, 103b and 103c, while within each base-station's respective range 104a, 104b and 104c. In example environment 100, vehicle 101 may traverse through portion(s), such as P3, which lay outside of any base-station's range and where little or no network access is available to vehicle 101. In example environment 100, vehicle 101 may also traverse through portion(s), such as P4, having an adverse environmental condition, such as inclement weather in the form of rain or fog, which reduces visibility for vehicle navigation.

In an exemplary embodiment, vehicle 101 includes a vehicle map information system 101a, communication device(s) 101b, processors 101c (shown later in FIG. 2), data storage unit(s) 101d (shown later in FIG. 2), sensor(s) 101e, and display unit(s) 101f (also shown later in FIG. 2). Here, communication device(s) 101b may be configured to download map information from remote information server 105. In an exemplary embodiment, vehicle map information system 101a enables vehicle 101 to obtain sufficient map information in order to autonomously navigate along route 102. As shown in FIG. 1, remote information server 105 includes a server map information system 105a and communication device(s) 105b configured to download map information to vehicle 101.

Figure 2:
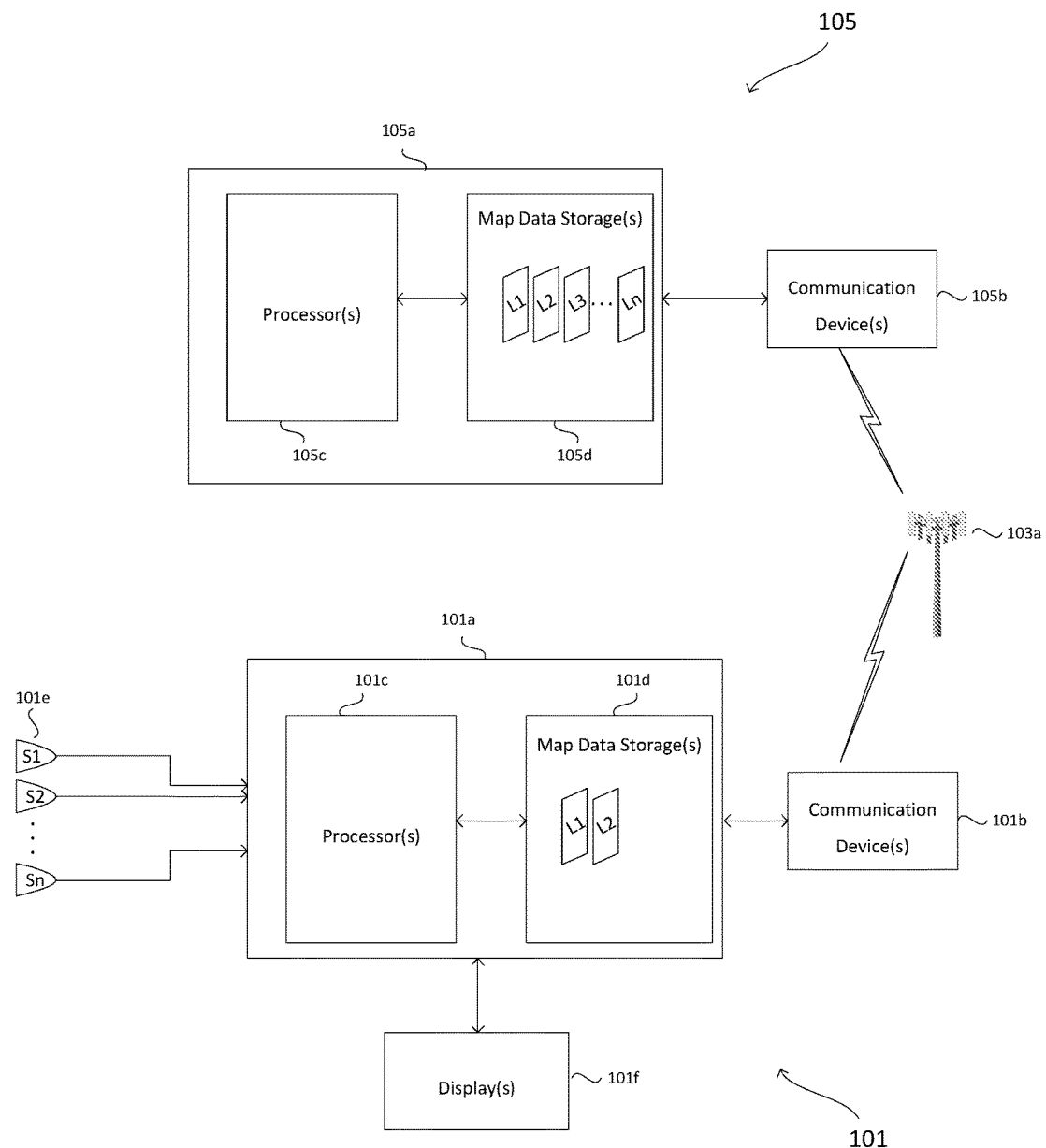
FIG. 2 includes a block diagram further illustrating various components for implementing aspects of the disclosure.

FIG. 2 includes a block diagram further illustrating various components for implementing aspects of the disclosure. As shown in FIG. 2, in remote information server 105, server map information system 105a further includes processor(s) 105c and map data storage 105d, which is configured to communicate with processor(s) 105c and store map information such as map data L1 through Ln, where "n" is an integer. In vehicle 101, vehicle map information system 101a further includes processor(s) 101c and map data storage 101d, which is configured to communicate with processor(s) 101c and store map information such as map data L1 and L2.

In an exemplary embodiment, vehicle map information system 101a also receives data from sensors(s) 101e. Each of sensor(s) 101e is configured to perform one or more types of scene capture such as via a camera, thermal sensing such as infrared, Light Detection And Ranging (LIDAR) or Radio Detection and Ranging (RADAR), amongst other forms of sensing. It is also contemplated that sensor(s) 101e could be distributed throughout vehicle 101 in different configurations or arrangements that provide improved data gathering, operating either as stand-alone sensors or as a collection of sensors working together.

In an exemplary embodiment, display unit(s) 101f, such as interactive display unit(s), are in communication with vehicle map information system 101a and are configured to provide and/or receive visual and/or audio data to and from the driver of vehicle 101.

Figure 3:
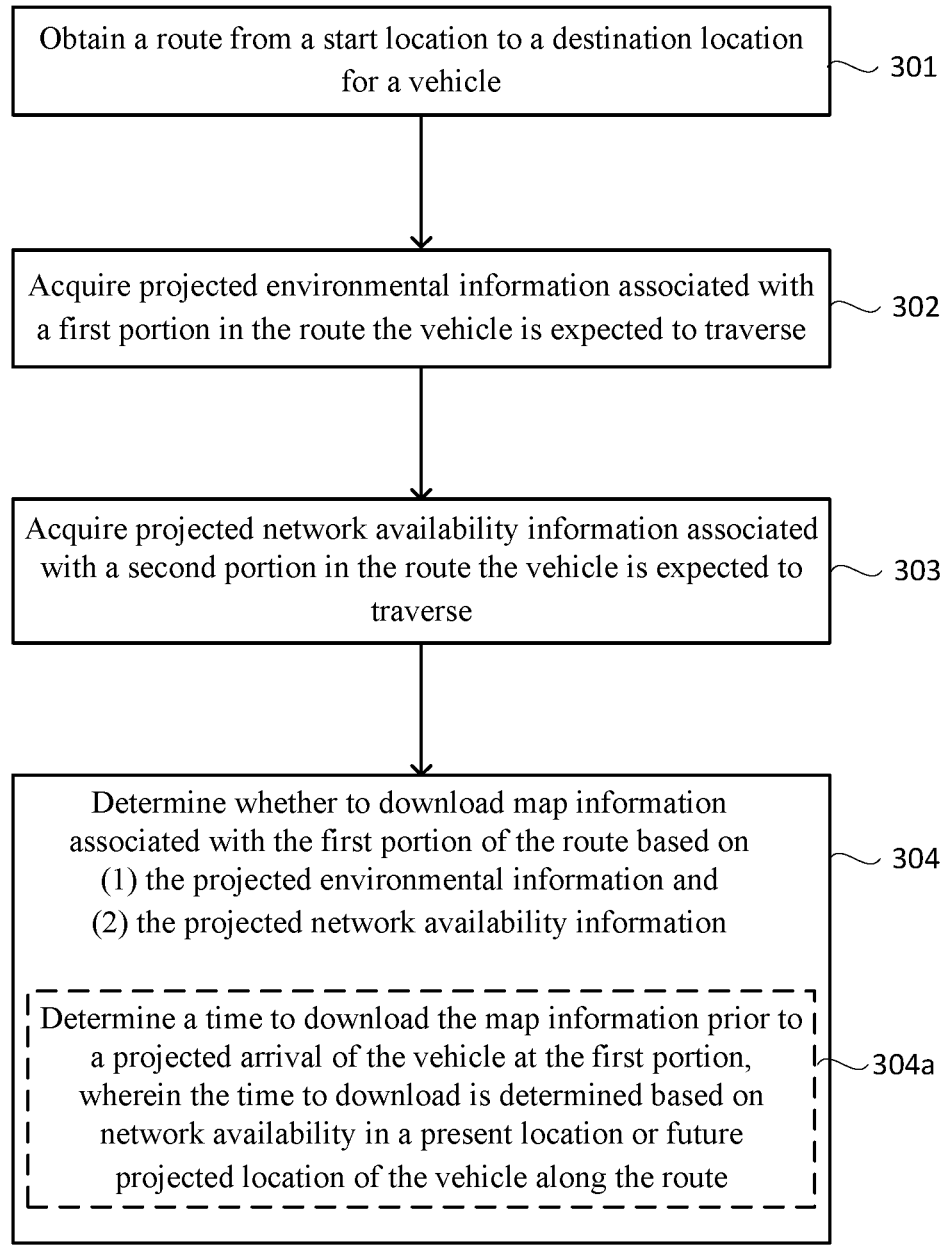
FIG. 3 illustrates an exemplary operation flow of various aspects of the disclosure.

The interactions between vehicle 101 and remote information server 105 will be now described in greater detail in an exemplary operation flow shown in FIG. 3, in conjunction with FIGS. 1 and 2. Starting in block 301, a route 102 is obtained for vehicle 101 from a start location, such as A, to a destination location, such as B. In an exemplary embodiment, processor(s) 101c are configured to obtain a route, such as route 102, for vehicle 101 from a driver's input, such as via interactive display unit(s) 101f or a voice command, and processor(s) 105c in server map information system 105a are configured to thereafter obtain the route information from vehicle 101 via communication devices 101b and 105b. In an alternate exemplary embodiment, processor(s) 105c in server map information system 105a are configured to obtain a route 102 by selecting from available routes between the start and destination locations.

Next, in block 302, projected environmental information associated with specific portion(s) (such as P4) of route 102, on which vehicle 101 is expected to traverse, is acquired. In an exemplary embodiment, processor(s) 105c of server map information system 105a are configured to acquire the environmental information from a weather report, or from other vehicles already in or near that specific portion(s) of route 102. As described below and in greater detail in conjunction with FIG. 4, the environmental information might also be acquired by vehicle 101 based on sensors 101e on vehicle 101, if the specific portion(s) is within range of sensors 101e.

Next, in block 303, projected network availability information is acquired for some or all portions preceding or co-located with specific portion(s) P4 (such as P1, P2 or P3) in route 102 that vehicle 101 is expected to traverse. In an exemplary embodiment, processor(s) 105c in server map information system 105a are configured to obtain the network availability information, and processor(s) 101c in vehicle map information system 101a are configured to in turn obtain the network availability information from server map information system 105a.

Next in block 304, it is determined whether to download map information associated with specific portion(s) (such as P4) of route 102 based on: (1) the projected environmental information (acquired in block 302) for specific portion(s) and (2) the projected network availability information (acquired in block 303), for some or all portions (such as P1, P2 or P3) preceding or co-located with specific portion(s) (such as P4). For example, the projected environmental information for P4 might show no inclement weather and visibility being high. In that case, autonomous driving through portion P4 may be relatively simple and can be accomplished with route information already contained in vehicle map information system 101a. Thus, it might be determined that there is no need for downloading of additional map information (e.g., HD map information) associated with portion P4. On the other hand, if the projected environmental information for portion P4 shows inclement weather and visibility being low (as in FIG. 1), then it might be determined that there is a need for downloading of map information associated with portion P4 prior to the arrival of vehicle 101 in portion P4, based on network availability in portions prior to P4, such as portions P1, P2 or P3. The map information is then downloaded according to the above determinations.

As shown in block 304(a), the determining stage of block 304 may further include determining a time or time-period to download the map information prior to a projected arrival of vehicle 101 at portion P4, based on network availability in either a present location (such as P1) or future projected location of vehicle 101 (such as in portions P2 and P3) along route 102. As shown in FIG. 1, there is little or no network availability in portion P3, therefore the determination might be made to download map information during the time period in which vehicle 101 traverses portion(s) along route 102 with network availability, such as either or both of portions P1 or P2 which are within range 104a and 104b of base-stations 103a and 103b, respectively.

Figure 4:
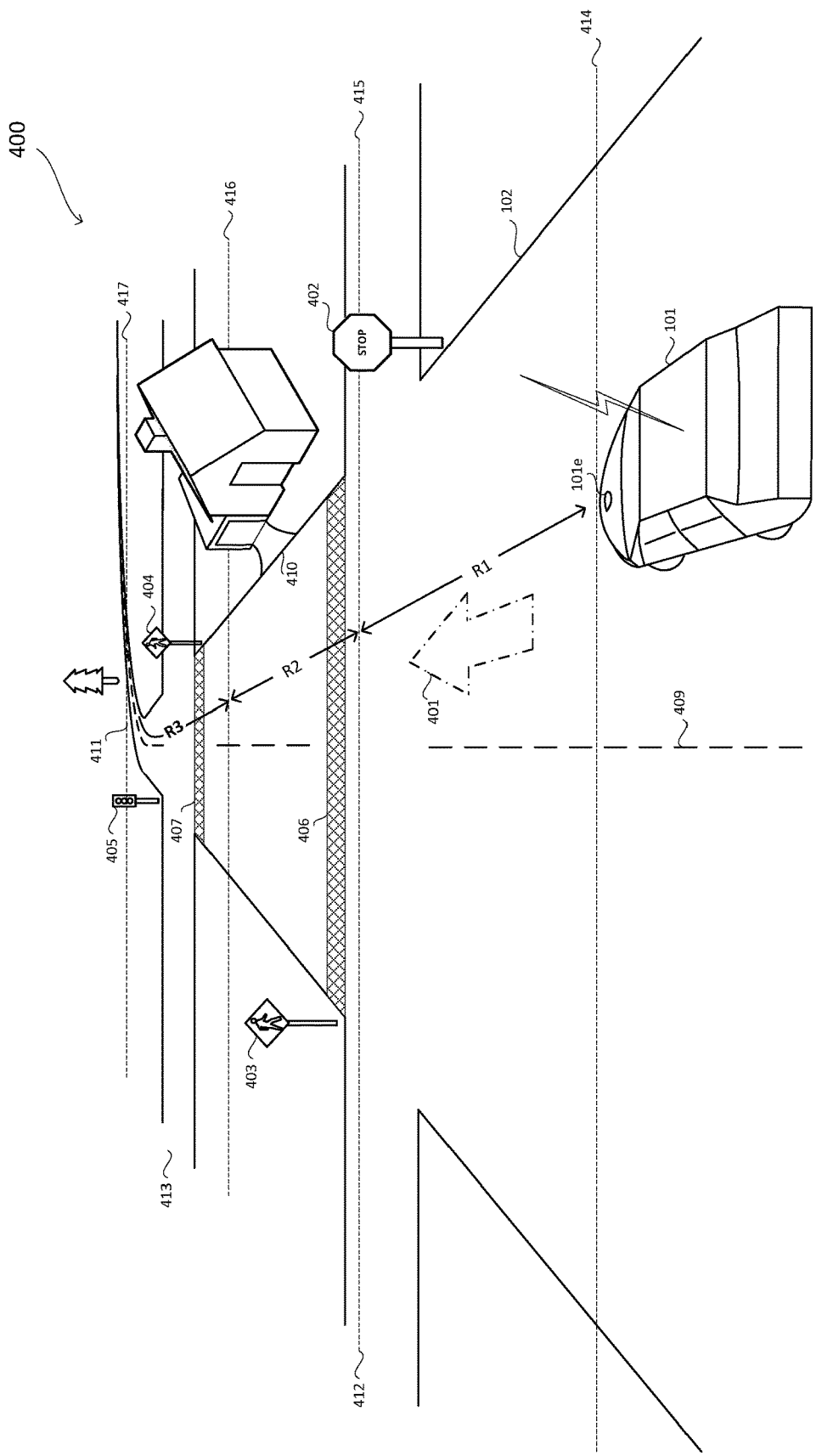
FIG. 4 illustrates in greater detail an exemplary route portion in accordance with various aspects of the disclosure.

FIG. 4 illustrates in greater detail an exemplary route portion 400, which can be anywhere along route 102 of FIG. 1. As shown in FIG. 4, vehicle 101 traverses route 102 along the direction of arrow 401. As illustrated, route portion 400 may include a number of exemplary features relevant to navigation such as traffic signs, including stop sign 402, pedestrian cross walk sign 403 and 404, traffic light 405, pedestrian cross walk markings 406 and 407, center line 409, driveway entrance 410, road curve 411, and cross streets 412 and 413. In an exemplary embodiment, car sensor(s) 101e can detect the presence of the above-mentioned features and provide the information to vehicle 101's processor(s) 101c. In an exemplary embodiment, processor(s) 101c compares the sensor information to the map information pre-stored in data storage unit(s) 101d for use in autonomous driving.

The map information pre-stored in data storage unit(s) 101d may be stored based on levels of detail, such as L1 and L2 as shown in FIG. 2. Levels of detail may correspond to map data for features relevant to navigation in one or more portions in route 102. For example, L1 may correspond to map data for features relevant to navigation in a portion R1 between lines 414 and 415, L2 to a portion R2 between lines 415 and 416, and L3 to a portion R3 between lines 416 and 417, in FIG. 4. Alternatively, levels of detail may be based on other criteria, such as image resolution in each potion, categorization based on different types of objects or features in route 102 or any portion of route 102, etc.

Environmental conditions, however, may hamper sensor(s) 101e. For example, a foggy condition may obscure from sensor(s) 101e some or all of the above-mentioned features in portions R2 or R3, such as pedestrian cross walk sign 404 and markings 407 in R2, or road curve 411 in R3. Vehicle 101 may then have to rely primarily on map information on R2 and R3 pre-stored in data storage unit(s) 101d for its autonomous driving needs. If, for example, map information for R3 has not been pre-stored in data storage unit(s) 101d, then it will have to be obtained from server map information system 105a. Alternatively, as described in conjunction with FIG. 3, server map information system 105a may predictively provide the map information for R3 to vehicle 101 based on acquired projected environmental information associated with that portion (such as from sensors in other vehicles already in that portion ahead of vehicle 101), and determine to download the map information for R3 based on the criteria described above conjunction with block 304 in FIG. 3.

Figure 5:
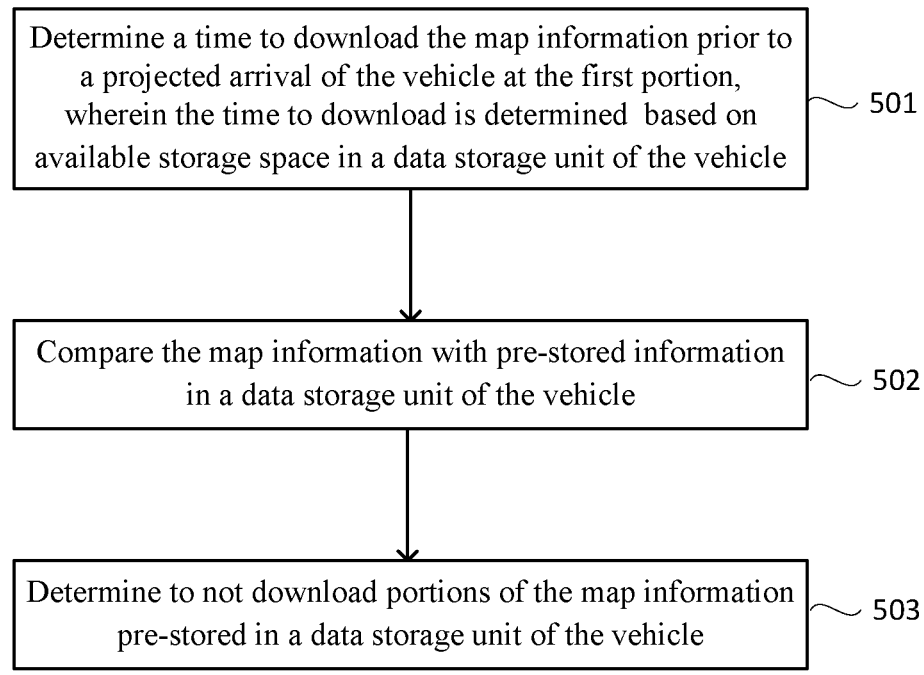
FIG. 5 illustrates in greater detail the exemplary operational flow shown in FIG. 3.

FIG. 5 illustrates additional exemplary criteria that may be used in block 304 of FIG. 3 to determine the timing and nature of the download. As shown in block 501, the determining stage may further include determining a time or time-period to download the map information based on available storage space in data storage unit(s) 101d of vehicle 101. In an exemplary embodiment, if the storage space in data storage unit(s) 101d is deemed insufficient, then server map information system 105a may wait until sufficient storage space is available, such as waiting until data storage unit(s) 101d has cleared storage space previously used for map information for portions of route 102 that have already been traversed.

Server map information system 105a may also compare the map information with pre-stored information in data storage unit(s) 101d, as in block 502, and not download portions of map information pre-stored in data storage unit(s) 101d of vehicle 101, as in block 503. For example, referring to FIG. 2, server map information system 105a may compare its stored map data L1, L2 and L3 in data storage unit(s) 105d with corresponding stored map data in data storage unit(s) 101d and discover that L1 and L2 are already present in data storage unit(s) 101d. Server map information system 105a may then determine not to download L1 and L2. In this example, only L3 and other information not contained in L1 or L2 is downloaded.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims recite various steps in a sample order. Unless otherwise specified, the order in which the steps are recited is not meant to require a particular order in which the steps must be executed.

The previous description is provided to enable any person skilled in the art to practice the various aspects described herein. Various modifications to these aspects will be readily apparent to those skilled in the art, and the generic principles defined herein may be applied to other aspects.

While some examples of methods and systems herein are described in terms of software executing on various machines, the methods and systems may also be implemented as specifically-configured hardware, such as a field-programmable gate array (FPGA) specifically configured to execute the various steps of particular method(s). For example, relevant operations can be implemented in digital electronic circuitry, or in computer hardware, firmware, software, or in a combination thereof. In one example, a device may include a processor or processors. The processor may be coupled to a computer-readable medium, such as a random access memory (RAM). The processor may execute computer-executable program instructions stored in memory, such as executing one or more computer programs. Such processors may comprise a microprocessor, a digital signal processor (DSP), an application-specific integrated circuit (ASIC), field programmable gate arrays (FPGAs), and/or state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, optical media, magnetic tape or other magnetic media, and/or any other medium from which a computer processor can read. The processor, and the processing, described may be in one or more structures, and may be dispersed through one or more structures. The processor may comprise code for carrying out one or more of the methods (or parts of methods) described herein.

The foregoing description has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method, comprising:
   obtaining, by a processor of a vehicle, a route from a start location to a destination location for the vehicle;
   acquiring, by the processor, projected environmental information associated with a first portion in the route the vehicle is expected to traverse, the projected environmental information indicating low visibility in the first portion in the route;
   acquiring, by the processor, projected network availability information associated with a second portion in the route the vehicle is expected to traverse; and
   determining, by the processor, whether to download map information associated with the first portion of the route based on (1) the projected environmental information and (2) the projected network availability information.

2. The method of claim 1, wherein the second portion precedes the first portion in the route toward the destination location.

3. The method of claim 1, wherein the second portion and the first portion are substantially co-located on the route.

4. The method of claim 1, determining whether to download map information further comprising:
   comparing the map information with pre-stored information in a data storage unit of the vehicle; and
   determining to not download portions of the map information pre-stored in a data storage unit of the vehicle.

5. The method of claim 1, determining whether to download map information further comprising:
   determining a time to download the map information prior to a projected arrival of the vehicle at the first portion, wherein the time to download is determined based on network availability in at least one of a present location or future projected location of the vehicle along the route.

6. The method of claim 1, determining whether to download map information further comprising:
   determining a time to download the map information prior to a projected arrival of the vehicle at the first portion, wherein the time to download is determined based on available storage space in a data storage unit of the vehicle.

7. The method of claim 1, further comprising: downloading the map information based on the determining.

8. The method of claim 1, wherein the environmental information is acquired based on information received from at least one sensor housed within the vehicle.

9. The method of claim 1, wherein the environmental information is acquired based on information received from at least one sensor housed within at least one other vehicle.

10. The method of claim 1, wherein the map information is used to autonomously navigate the vehicle.

11. An apparatus comprising:
    a processor configured to obtain a route from a start location to a destination location for a vehicle, the processor further configured to determine whether to download map information associated with a first portion of the route based on (1) acquired projected environmental information associated with the first portion in the route the vehicle is expected to traverse, the projected environmental information indicating low visibility in the first portion in the route, and (2) acquired projected network availability information associated with a second portion in the route the vehicle is expected to traverse; and
    a data storage unit configured to communicate with the processor and to store map information.

12. The apparatus of claim 11, wherein the data storage unit is housed within the vehicle and configured to store downloaded map information.

13. The apparatus of claim 12, the processor is further configured to compare the map information with pre-stored information in a data storage unit of the vehicle; and to not download portions of the map information pre-stored in a data storage unit of the vehicle.

14. The apparatus of claim 11, the processor is further configured to determine a time to download the map information prior to a projected arrival of the vehicle at the first portion,
    wherein the time to download is based on network availability in at least one of a present location and future projected location of the vehicle along the route.

15. The apparatus of claim 12, the processor is further configured to determine a time to download the map information prior to a projected arrival of the vehicle at the first portion,
    wherein the time to download is based on available storage space in a data storage unit of the vehicle.

16. The apparatus of claim 11, further comprising: a communication device configured to download the map information.

17. The apparatus of claim 11, further comprising at least one sensor housed within the vehicle configured to obtain the environmental information for the processor.

18. The apparatus of claim 11, the processor further configured to navigate the vehicle based on the downloaded map information.

19. An apparatus comprising:
    means for obtaining a route from a start location to a destination location for a vehicle;
    means for acquiring projected environmental information associated with a first portion in the route the vehicle is expected to traverse, the projected environmental information indicating low visibility in the first portion in the route;
    means for acquiring projected network availability information associated with a second portion in the route the vehicle is expected to traverse; and
    means for determining whether to download map information associated with the first portion of the route based on (1) the projected environmental information and (2) the projected network availability information.

20. The apparatus of claim 19, wherein the means for determining whether to download map information further comprising:
    means for determining a time to download the map information prior to a projected arrival of the vehicle at the first portion, wherein the time to download is determined based on (a) network availability in at least one of a present location or future projected location of the vehicle along the route, or (b) available storage space in a data storage unit of the vehicle; and
    means for comparing the map information with pre-stored information in a data storage unit of the vehicle, and not downloading portions of the map information pre-stored in a data storage unit of the vehicle.

* * * * *